United States Patent
Wei et al.

(10) Patent No.: US 9,152,031 B2
(45) Date of Patent: Oct. 6, 2015

(54) LIGHT SOURCE MODULE AND PROJECTION APPARATUS

(75) Inventors: Ching-Chuan Wei, Hsin-Chu (TW);
Shu-Min Chen, Hsin-Chu (TW);
Hao-Wei Chiu, Hsin-Chu (TW);
Ko-Shun Chen, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 544 days.

(21) Appl. No.: 13/606,013

(22) Filed: Sep. 7, 2012

(65) Prior Publication Data
US 2013/0176540 A1     Jul. 11, 2013

(30) Foreign Application Priority Data
Jan. 11, 2012 (CN) .......................... 2012 1 0007006

(51) Int. Cl.
G03B 21/00 (2006.01)
G03B 21/20 (2006.01)
G02B 26/00 (2006.01)
(Continued)

(52) U.S. Cl.
CPC .......... *G03B 21/2073* (2013.01); *G02B 26/008* (2013.01); *G02B 27/1033* (2013.01); *G02B 27/286* (2013.01); *G03B 21/204* (2013.01); *G03B 33/08* (2013.01); *G02B 27/283* (2013.01); *H04N 9/3167* (2013.01); *H04N 9/3197* (2013.01)

(58) Field of Classification Search
CPC . H04N 9/3105; H04N 9/3167; H04N 9/3197; G02B 27/145; G02B 27/283
USPC .......... 353/20, 31, 38, 84, 94, 98; 362/19, 84, 362/231
See application file for complete search history.

(56) References Cited

U.S. PATENT DOCUMENTS

| 6,710,921 B2 | 3/2004 | Hansen et al. |
| 7,445,340 B2 | 11/2008 | Conner et al. |

(Continued)

FOREIGN PATENT DOCUMENTS

| CN | 1591084 | 3/2005 |
| CN | 1693987 | 11/2005 |

(Continued)

OTHER PUBLICATIONS

"Office Action of China Counterpart Application", issued on Aug. 28, 2014, p. 1-p. 5.

*Primary Examiner* — Sultan Chowdhury
(74) *Attorney, Agent, or Firm* — Jianq Chyun IP Office

(57) ABSTRACT

A light source module includes a light-emitting device, a wavelength conversion device and a polarization and color separation unit. The light-emitting device provides an excitation beam including a first portion beam having a first polarization direction. The wavelength conversion device includes a first wavelength conversion area and a polarization conversion area. When the first portion beam irradiates the first wavelength conversion area, the first portion beam is converted into a first color beam. When the first portion beam irradiates the polarization conversion area, the first polarization direction of the first portion beam is converted to a second polarization direction. The polarization and color separation unit is disposed between the wavelength conversion device and the light-emitting device, and transmits the first portion beam with the first polarization direction, and reflects the first portion beam with the second polarization direction and the first color beam to the same direction.

22 Claims, 4 Drawing Sheets

(51) Int. Cl.
*G02B 27/10* (2006.01)
*G03B 33/08* (2006.01)
G02B 27/28 (2006.01)
H04N 9/31 (2006.01)

(56) References Cited

U.S. PATENT DOCUMENTS

| | | | |
|---|---|---|---|
| 7,547,114 B2 | 6/2009 | Li et al. | |
| 7,726,861 B2 | 6/2010 | Xu | |
| 7,744,241 B2 | 6/2010 | Xu | |
| 8,002,413 B2 | 8/2011 | Narikawa | |
| 8,008,694 B2 | 8/2011 | Xu et al. | |
| 8,035,299 B2 | 10/2011 | Ishida et al. | |
| 8,985,775 B2* | 3/2015 | Matsubara | 353/20 |
| 2007/0002282 A1* | 1/2007 | Chen et al. | 353/31 |
| 2009/0122408 A1 | 5/2009 | Lin | |
| 2009/0262308 A1 | 10/2009 | Ogawa | |
| 2009/0284148 A1 | 11/2009 | Iwanaga | |
| 2010/0079730 A1 | 4/2010 | Shibasaki | |
| 2010/0238412 A1 | 9/2010 | Kurosaki | |
| 2010/0245776 A1 | 9/2010 | Yamamoto | |
| 2010/0245777 A1 | 9/2010 | Ogura | |
| 2010/0328554 A1 | 12/2010 | Shibasaki | |
| 2010/0328617 A1 | 12/2010 | Masuda | |
| 2010/0328625 A1 | 12/2010 | Miyazaki et al. | |
| 2010/0328627 A1 | 12/2010 | Miyazaki | |
| 2010/0328628 A1 | 12/2010 | Masuda | |
| 2010/0328632 A1 | 12/2010 | Kurosaki et al. | |
| 2010/0328633 A1 | 12/2010 | Sato et al. | |
| 2011/0043764 A1 | 2/2011 | Narikawa | |
| 2011/0043765 A1 | 2/2011 | Shibasaki | |
| 2011/0051102 A1 | 3/2011 | Ogura et al. | |
| 2011/0063581 A1 | 3/2011 | Iwanaga | |
| 2011/0075103 A1 | 3/2011 | Ogawa et al. | |
| 2011/0075106 A1 | 3/2011 | Shibasaki | |
| 2011/0096296 A1 | 4/2011 | Ogawa | |
| 2011/0096300 A1 | 4/2011 | Shibasaki | |
| 2011/0187999 A1* | 8/2011 | Hirata et al. | 353/20 |
| 2011/0234998 A1 | 9/2011 | Kurosaki | |
| 2011/0310363 A1* | 12/2011 | Kita | 353/98 |
| 2012/0133846 A1* | 5/2012 | Ishii | 348/744 |
| 2012/0154767 A1* | 6/2012 | Kimura et al. | 353/98 |
| 2013/0176540 A1* | 7/2013 | Wei et al. | 353/20 |

FOREIGN PATENT DOCUMENTS

| | | |
|---|---|---|
| CN | 1786769 | 6/2006 |
| CN | 101171846 | 4/2008 |
| EP | 1463339 | 9/2004 |
| JP | 2004012729 | 1/2004 |
| JP | 2005208318 | 8/2005 |
| TW | 380213 | 1/2000 |
| WO | 03015420 | 2/2003 |
| WO | 2011037014 | 3/2011 |

* cited by examiner

LIGHT SOURCE MODULE AND PROJECTION APPARATUS

CROSS-REFERENCE TO RELATED APPLICATION

This application claims the priority benefit of China application serial no. 201210007006.2, filed on Jan. 11, 2012. The entirety of the above-mentioned patent application is hereby incorporated by reference herein and made a part of this specification.

BACKGROUND OF THE INVENTION

1. Field of the Invention

The invention relates to an optical device. Particularly, the invention relates to a light source module and a projection apparatus.

2. Description of Related Art

With development of display technology, in a projection apparatus, besides that an ultra high pressure lamp (UHP lamp) suitable for emitting a white light can be used together with a color wheel to sequentially generate a red light, a green light and a blue light, so that the projection apparatus can provide color images. In recent years, the projection apparatus using light-emitting diodes (LEDs) as light sources is further developed. However, since the light-emitting efficiency of an LED has limitation, some technicians use a mixed light source design in the projection apparatus to enhance a luminance of the projection apparatus. A commonly mixed light source is, for example, composed of LEDs and a laser light source.

In detail, in a design of the mixed light source, a blue laser is used to excite a green fluorescent powder on a color wheel, so that the blue laser is converted into a new green light source, and in collaboration with a light combining system, the converted green light source is combined with a blue light and a red light provided by the LEDs to provide an illumination light source required by a projector.

Moreover, in some designs of a light source system, the blue laser is used to excite fluorescent powder of different positions on the color wheel to respectively generate a red light and a green light. Transmission paths of the green light and the red light are combined after passing through the light combining system. Since the red light and the green light are generated by using the blu-ray laser to excite the fluorescent powder, such optical design can reduce usage of the red LEDs and the green LEDs. However, in order to use the blue laser as a blue light source of the light source system, those skilled in the art configure a plurality of reflectors in the light source system to guide the blue laser to a transmission direction the same as that of the red light and the green light, and the light combining system combines the light transmission paths. In this way, the number of optical devices is increased, and a whole size of the light source system is increased.

On the other hand, in the optical design of the projection apparatus, based on a light valve, the projection apparatus can be divided into a light source illumination system from the light source to the light valve and an imaging optical system from the light valve to a lens or a screen. The light source illumination system is a non-imaging system, which is mainly used to provide uniform illumination, sufficient color and high conversion efficiency. Moreover, a light source module of the projection apparatus may also have different designs for different purposes. For example, Taiwan Patent No. 380213 discloses a light device including a light source module and an optical lens, and the light source module comprises a plurality of low power light-emitting devices arranged in an array. Moreover, U.S. Pat. No. 7,445,340 discloses a lighting device including an LED light source, an optical device set and a fluorescent material. Besides, U.S. Pat. No. 6,710,921 also discloses a technique related to the illumination device.

SUMMARY OF THE INVENTION

The invention is directed to a light source module, which has less optical devices and a smaller size.

The invention is directed to a projection apparatus, which has a smaller size.

Other objects and advantages of the invention are further illustrated by the technical features broadly embodied and described as follows.

In order to achieve one or a portion of or all of the objects or other objects, an embodiment of the invention provides a light source module. The light source module includes a light-emitting device, a wavelength conversion device and a polarization and color separation unit. The light-emitting device is used to provide an excitation beam. The excitation beam includes a first portion beam, and the first portion beam has a first polarization direction. The wavelength conversion device is disposed on a transmission path of the first portion beam. The wavelength conversion device is suitable for rotating, and includes a first wavelength conversion area and a polarization conversion area. When the first portion beam irradiates the first wavelength conversion area, the first portion beam is converted into a first color beam. Moreover, when the first portion beam irradiates the polarization conversion area, the first polarization direction of the first portion beam is converted into a second polarization direction. The polarization and color separation unit is disposed between the wavelength conversion device and the light-emitting device. The polarization and color separation unit is suitable for transmitting the first portion beam with the first polarization direction and reflecting the first portion beam with the second polarization direction and the first color beam to a same direction.

Besides, an embodiment of the invention provides a projection apparatus. The projection apparatus includes the aforementioned light source module, a projection lens and a light valve. The projection lens is disposed on transmission paths of the first portion beam and the first color beam. The light valve is disposed between the light source module and the projection lens.

According to the above descriptions, the invention has at least one of following advantages. In embodiment of the invention, by configuring the wavelength conversion area and the polarization conversion area in the wavelength conversion device, and in collaboration with usage of the polarization and color separation unit, the converted color beam and the excitation beam including the first portion beam and the second portion beam are guided to the same direction, so that a simple light transmission path is designed, so as to reduce the number of the used optical devices. In this way, the light source module is miniaturized, and the projection apparatus using the aforementioned light source module may have a smaller size.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
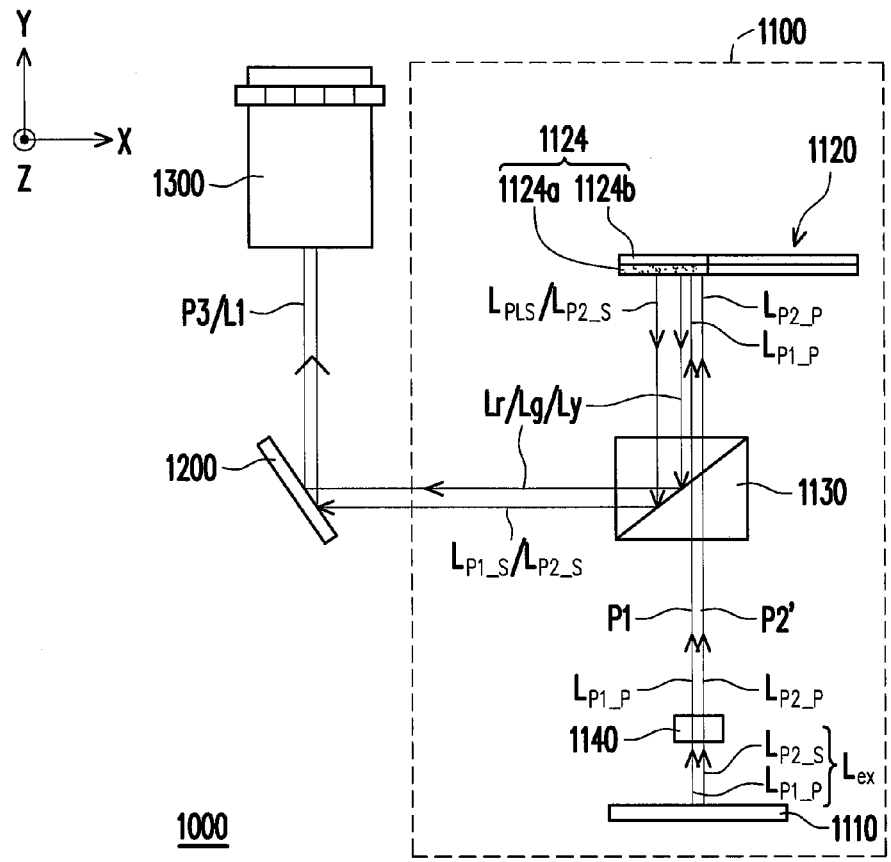
FIG. 1A is a top view of a projection apparatus according to a first embodiment of the invention.

FIG. 1A is a top view of a projection apparatus according to the first embodiment of the invention. Referring to FIG. 1A, the projection apparatus 1000 of the embodiment includes a light source module 1100, a light valve 1200 and a projection lens 1300. The light source module 1100 includes a light-emitting device 1110, a wavelength conversion device 1120 and a polarization and color separation unit 1130. The light-emitting device 1110 is used to provide an excitation beam $L_{ex}$. The excitation beam $L_{ex}$ includes a first portion beam $L_{P1\_P}$ and a second portion beam $L_{P2\_S}$, wherein the first portion beam $L_{P1\_P}$ has a first polarization direction, and the second portion beam $L_{P2\_S}$ has a second polarization direction. However, the excitation beam $L_{ex}$ is not limited to only include the first portion beam $L_{P1\_P}$ having the first polarization direction and the second portion beam $L_{P2\_S}$ having the second polarization direction. In other words, the excitation beam $L_{ex}$ may also have a portion beam having other polarization direction at the same time. In the embodiment, the first polarization direction is, for example, P-polarization. However, in other embodiments, the first polarization direction may also be S-polarization. Moreover, the light-emitting device 1110 may be a blue laser or other solid-state light source providing a blue waveband, for example, a light-emitting diode (LED) light source.

Figure 1B:
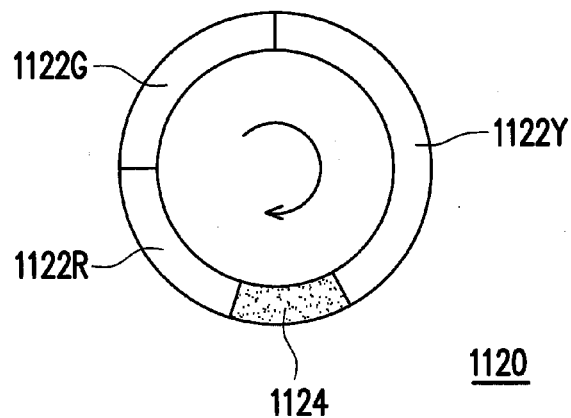
FIG. 1B is a top view of a wavelength conversion device of FIG. 1A viewed along a Y-direction.

FIG. 1B is a top view of the wavelength conversion device 1120 of FIG. 1A viewed along a Y-direction. Referring to FIG. 1A and FIG. 1B, the wavelength conversion device 1120 is disposed on a transmission path P1 of the first portion beam $L_{P1\_P}$. The wavelength conversion device 1120 is suitable for rotating. For example, the wavelength conversion device 1120 of the embodiment is, for example, a phosphor wheel. In detail, the wavelength conversion device 1120 includes a wavelength conversion area 1122R and a polarization conversion area 1124. When the first portion beam $L_{P1\_P}$ irradiates the wavelength conversion area 1122R of FIG. 1B, the first portion beam $L_{P1\_P}$ is converted into a color beam Lr (shown in FIG. 1A). On the other hand, when the first portion beam $L_{P1\_P}$ irradiates the polarization conversion area 1124 of FIG. 1A and FIG. 1B, the first polarization direction (for example, P-polarization) of the first portion beam $L_{P1\_P}$ is converted into a second polarization direction (for example, the S-polarization), where the converted first portion beam is $L_{P1\_S}$ as that shown in FIG. 1A. It should be noticed that in the embodiment, although the first polarization direction and the second polarization direction are respectively P-polarization and S-polarization, in other embodiments, the first polarization direction and the second polarization direction may also be S-polarization and P-polarization, and the invention is not limited thereto.

Moreover, as shown in FIG. 1A, the polarization conversion area 1124 of the wavelength conversion device 1120 includes a quarter-wave plate 1124a and a reflection sheet 1124b. In the embodiment, the quarter-wave plate 1124a is disposed on the reflection sheet 1124b. Since the first portion beam $L_{P1\_P}$ passes through the quarter-wave plate 1124a back and forth for twice, it is equivalent to a situation that the first portion beam $L_{P1\_P}$ passes through a half-wave plate, so that the first polarization direction (for example, P-polarization) of the first portion beam $L_{P1\_P}$ is converted into the second polarization direction (for example, the S-polarization), so as to form the first portion beam $L_{P1\_S}$ as that shown in FIG. 1A.

As shown in FIG. 1A, the polarization and color separation unit 1130 is disposed between the wavelength conversion device 1120 and the light-emitting device 1110. The polarization and color separation unit 1130 transmits the first portion beam $L_{P1\_P}$ with the first polarization direction, and reflects the first portion beam $L_{P1\_S}$ with the second polarization direction and the color beam Lr to the same direction, so that the first portion beam $L_{P1\_S}$ with the second polarization direction and the color beam Lr are transmitted to the light valve 1200. In the embodiment, a color of the first portion beam $L_{P1\_S}$ is, for example, blue, and the color beam Lr is, for example, a red beam. Therefore, after the beams of different colors pass through the light valve 1200, an image beam L1 is generated. Then, the image beam L1 is transmitted to the projection lens 1300 to produce a color image on a screen (not shown).

Figure 1C:
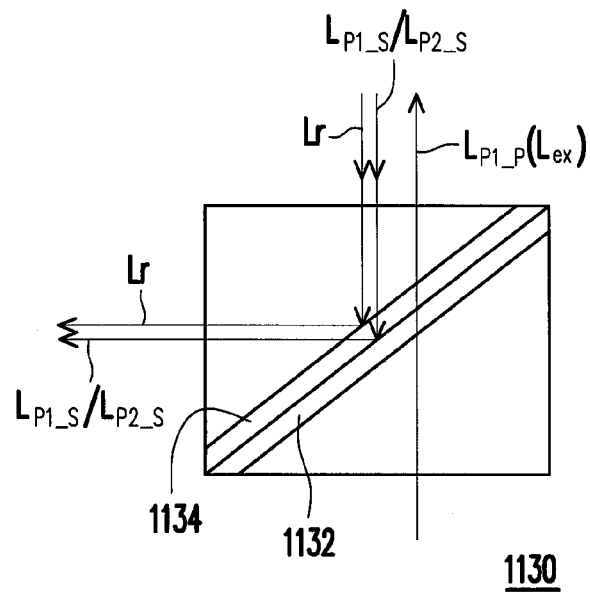
FIG. 1C is an enlarged view of a polarization and color separation unit of FIG. 1A.

FIG. 1C is an enlarged view of the polarization and color separation unit 1130 of FIG. 1A. Referring to FIG. 1C, the polarization and color separation unit 1130 includes a polarization unit 1132 and a color separation unit 1134. The polarization unit 1132 transmits the first portion beam $L_{P1\_P}$ with the first polarization direction, and reflects the first portion beam $L_{P1\_S}$ which is converted to the second polarization direction. The color separation unit 1134 is disposed between the polarization unit 1132 and the wavelength conversion device 1120 of FIG. 1A. The color separation unit 1134 transmits the excitation beam $L_{ex}$ and reflects the first color beam Lr. In the embodiment, the polarization unit 1132 is, for example, a polarization beam splitter (PBS), and the color separation unit 1134 is, for example, a dichroic film. The color separation unit 1134 is, for example, formed by alternately stacking optical films of different refractive indexes, which transmits the beam of a specific waveband, and reflects beams of other wavebands (for example, red light, green light or yellow light). For example, in the embodiment, the color separation unit 1134 only transmits the waveband of blue light. Therefore, when the first portion beam $L_{P1\_P}$ is converted into the color beam Lr with another color by the wavelength conversion area 1122R and is incident to the color separation unit 1134, the color separation unit 1134 reflects the non-blue color beam Lr.

On the other hand, although the first polarization direction of the first portion beam $L_{P1\_P}$ is converted into the second polarization direction (corresponding to the referential number $L_{P1\_S}$) by the wavelength conversion area 1124 of FIG. 1B, since a wavelength of the converted first portion beam $L_{P1\_S}$ is not changed, i.e. the color of the first portion beam $L_{P1\_S}$ is still blue, the first portion beam $L_{P1\_S}$ may still penetrate through the color separation unit 1134. However, it should be noticed that since the polarization direction of the first portion beam $L_{P1\_S}$ is now changed, the first portion beam $L_{P1\_S}$ is reflected by the polarization unit 1132. Therefore, the first portion beam $L_{P1\_S}$ with the second polarization direction converted by the wavelength conversion area 1124 and the color beam Lr are respectively reflected to the same direction by the polarization unit 1132 and the color separation unit 1134 for beam combining.

Referring to FIG. 1A, in the embodiment, the excitation beam $L_{ex}$ further includes a second portion beam $L_{P2\_S}$ having the second polarization direction, and the light source module 1100 further includes a polarization conversion system 1140. In the embodiment, the polarization conversion system 1140 is, for example, a PS converter. As shown in FIG. 1A, the polarization conversion system 1140 is disposed between the polarization and color separation unit 1130 and the light-emitting device 1110. The polarization conversion system 1140 transmits the first portion beam $L_{P1\_P}$ with the first polarization direction, and converts the second polarization direction (for example, the S-polarization) of the second portion beam $L_{P2\_S}$ to the first polarization direction (for example, the P-polarization), so that the second portion beam $L_{P2\_P}$ is able to pass through the polarization conversion system 1140.

Figure 1D:
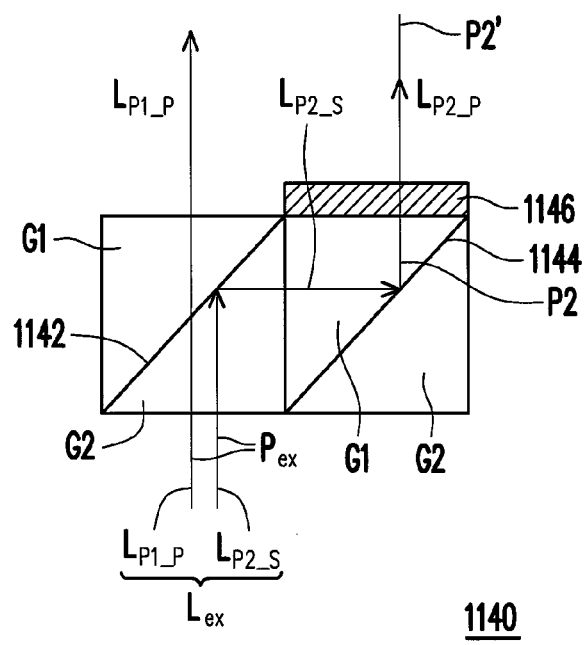
FIG. 1D is an enlarged view of a polarization conversion system of FIG. 1A.

FIG. 1D is an enlarged view of the polarization conversion system 1140 of FIG. 1A. Referring to FIG. 1D, the polarization conversion system 1140 of the embodiment includes polarization beam splitter units 1142 and 1144 and a half-wave plate 1146. The polarization beam splitter units 1142 and 1144 are, for example, polarization beam splitters. As shown in FIG. 1D, the polarization beam splitter unit 1142 is disposed on a transmission path $P_{ex}$ of the excitation beam $L_{ex}$. The polarization beam splitter unit 1142 transmits the first portion beam $L_{P1\_P}$ with the first polarization direction, and reflects the second portion beam $L_{P2\_S}$ with the second polarization direction.

Moreover, the half-wave plate 1146 is disposed on a transmission path P2 of the second portion beam $L_{P2\_S}$ with the second polarization direction, so as to convert the second polarization direction (for example, the S-polarization) of the second portion beam $L_{P2\_S}$ into the first polarization direction (for example, the P-polarization), where the converted second portion beam is denoted as $L_{P2\_P}$. Moreover, the polarization beam splitter unit 1144 is disposed between the polarization beam splitter unit 1142 and the half-wave plate 1146 for reflecting the second portion beam $L_{P2\_S}$ with the second polarization direction to the half-wave plate 1146. In the embodiment, the polarization beam splitter units 1142 and 1144 may be respectively formed by adhering two isosceles right triangle optical glass G1 and G2, where an adhering surface thereof is, for example, coated by multilayer films (not shown) to split beams with different polarization directions. In this way, by using the polarization beam splitter units 1142 and 1144 in collaboration with the half-wave plate 1146, a non-polarized beam (for example, the excitation beam $L_{ex}$) can be purified to one polarization state (for example, the P-polarization).

In detail, referring to FIG. 1A and FIG. 1D, the polarization and color separation unit 1130 and the wavelength conversion device 1120 are disposed on a transmission path P2' of the second portion beam $L_{P2\_P}$ with the first polarization direction, and the polarization and color separation unit 1130 transmits the second portion beam $L_{P2\_P}$ with the first polarization direction. Similarly, when the second portion beam $L_{P2\_P}$ with the first polarization direction irradiates the polarization conversion area 1124 (shown in FIG. 1B) of the wavelength conversion device 1120, the first polarization direction (for example, the P-polarization) of the second portion beam $L_{P2\_P}$ is converted to the second polarization direction (for example, S-polarization), and the converted second portion beam $L_{P2\_S}$ is reflected to a direction the same as a transmission direction of the color beam Lr by the polarization and color separation unit 1130. On the other hand, when the second portion beam $L_{P2\_P}$ irradiates the wavelength conversion area 1122R of FIG. 1A, the first portion beam $L_{P2\_P}$ is converted into the color beam Lr.

In order to fully convey the optical mechanism of the projection apparatus 1000 to those skilled in the art, details thereof are further described below.

Referring to FIG. 1A to FIG. 1D, in the embodiment, the excitation beam $L_{ex}$ emitted from the light-emitting device 1110 includes the first portion beam $L_{P1\_P}$ and the second portion beam $L_{P2\_S}$ with different polarization directions. The first polarization direction of the first portion beam is, for example, the P-Polarization, and the second polarization direction of the second portion beam is, for example, the S-Polarization perpendicular to the P-polarization, though the invention is not limited thereto. After the first portion beam $L_{P1\_P}$ and the second portion beam $L_{P2\_S}$ enter the polarization conversion system 1140, the first portion beam $L_{P1\_P}$ directly passes through the polarization conversion system 1140, and the second polarization direction of the second portion beam $L_{P2\_S}$ is converted into the first polarization direction to form the second portion beam $L_{P2\_P}$ with the first polarization direction, and the second portion beam $L_{P2\_P}$ leaves the polarization conversion system 1140.

In detail, when the excitation beam $L_{ex}$ is transmitted to the first polarization beam splitter unit 1142, the first portion beam $L_{P1\_P}$ and the second portion beam $L_{P2\_S}$ of different polarization directions of the excitation beam $L_{ex}$ are separated, and polarization states of the first portion beam $L_{P1\_P}$ and the second portion beam $L_{P2\_S}$ are perpendicular to each other. In the embodiment, the polarization beam splitter units 1142 and 1144 are designed to transmit the first portion beam $L_{P1\_P}$ with the first polarization direction and reflect the second portion beam $L_{P2\_S}$ with the second polarization direction. Then, when the reflected second portion beam $L_{P2\_S}$ is transmitted to the second polarization beam splitter unit 1144, it is again reflected to the half-wave plate 1146. Since the half-wave plate 1146 may shift a wavelength phase of the beam by a half wavelength, the second portion beam $L_{P2\_S}$ with the second polarization direction is converted to the second portion beam $L_{P2\_P}$ with the first polarization direction. In this way, after the first portion beam $L_{P1\_P}$ and the second portion beam $L_{P2\_P}$ all have the same first polarization direction (for example, P-polarization) after leaving the polarization conversion system 1140.

Referring to FIG. 1A and FIG. 1B, the first portion beam $L_{P1\_P}$ and the second portion beam $L_{P2\_P}$ with the same polarization direction are transmitted to the wavelength conversion device 1120 after passing through the polarization and color separation unit 1130. As shown in FIG. 1B, the wavelength conversion device 1120 of the embodiment further includes a wavelength conversion area 1122G. When the first portion beam $L_{P1\_P}$ and the second portion beam $L_{P2\_P}$ irradiate the wavelength conversion area 1122G of the wavelength conversion device 1120, the first portion beam $L_{P1\_P}$ and the second portion beam $L_{P2\_P}$ are converted into a color beam Lg, and the color beam Lg is reflected by the polarization and color separation unit 1130. The color beam Lg is, for example, a green beam.

Similarly, when the first portion beam $L_{P1\_P}$ and the second portion beam $L_{P2\_P}$ irradiate the polarization conversion area 1124 of the wavelength conversion device 1120 of FIG. 1B, the first portion beam $L_{P1\_P}$ and the second portion beam $L_{P2\_P}$ with the first polarization direction are converted into the first portion beam $L_{P1\_S}$ and the second portion beam $L_{P2\_S}$ with the second polarization direction, and are reflected by the polarization unit 1132 of the polarization and color separation unit 1130 of FIG. 1C. In this way, the color beam Lr (for example, a red beam), the color beam Lg (for example, a green beam) and a blue beam composed of the first portion beam $L_{P1\_S}$ and the second portion beam $L_{P2\_S}$ are transmitted to the light valve 1200, and the different color beams are converted into the image beam L1 after being reflected by the light valve 1200, and are transmitted to the projection lens 1300.

As shown in FIG. 1A, the projection lens 1300 is disposed on a transmission path P3 of the image beam L1, and is used for projecting the image beam L1 on a screen (not shown). In this way, image frames can be formed on the screen. Moreover, in the embodiment, the light valve 1200 is, for example, a digital micro-mirror device (DMD). However, in other embodiments, the light valve 1200 can also be a liquid-crystal-on-silicon panel, a transmissive liquid crystal panel or a spatial light modulator (SLM).

Besides, as shown in FIG. 1B, the wavelength conversion device 1120 of the embodiment further includes a wavelength conversion area 1122Y. When the first portion beam $L_{P1\_P}$ and the second portion beam $L_{P2\_P}$ passing through the polarization and color separation unit 1130 irradiate the wavelength conversion area 1122Y of the wavelength conversion device 1120, the first portion beam $L_{P1\_P}$ and the second portion beam $L_{P2\_P}$ are converted into a color beam Ly, and the color beam Ly is reflected by the polarization and color separation unit 1130. In the embodiment, the color beam Ly is, for example, a yellow beam, and the yellow beam may increase a luminance of the image frame. It should be noticed that in the embodiment, although the color beams Lr, Lg and Ly are respectively the red beam, the green beam and the yellow beam, in other embodiments, the color beams Lr, Lg and Ly can also be light beams of other colors, and the invention is not limited thereto. Moreover, although the wavelength conversion device 1120 of the embodiment includes three wavelength conversion areas 1122R, 1122G and 1122Y, the number of the wavelength conversion areas is not limited thereto, which can be adjusted by a designer according to actual requirements.

Further, as shown in FIG. 1B, the wavelength conversion device 1120 is capable of rotating, so that the first portion beam $L_{P1\_P}$ and the second portion beam $L_{P2\_P}$ of the excitation beam $L_{ex}$ may alternately irradiate the wavelength conversion areas 1122R, 1122G and 1122Y and the polarization conversion area 1124. Moreover, the wavelength conversion areas 1122R, 1122G and 1122Y, for example, include fluorescent layers corresponding to different color light waveband, where the color light waveband is, for example, a red light waveband, a green light waveband or a yellow light waveband, though the invention is not limited thereto.

As described above, when the first portion beam $L_{P1\_P}$ and the second portion beam $L_{P2\_P}$ irradiate the polarization conversion area 1122R, the first portion beam $L_{P1\_P}$ and the second portion beam $L_{P2\_P}$ are converted into the color beam Lr (for example, the red beam). Similarly, when the first portion beam $L_{P1\_P}$ and the second portion beam $L_{P2\_P}$ irradiate the polarization conversion area 1122G or 1122Y, the first portion beam $L_{P1\_P}$ and the second portion beam $L_{P2\_P}$ are converted into the color beam Lg or Ly. Besides, when the first portion beam $L_{P1\_P}$ and the second portion beam $L_{P2\_P}$ irradiate the polarization conversion area 1124, the first polarization direction of the first portion beam $L_{P1\_P}$ and the second portion beam $L_{P2\_P}$ is converted into the second polarization direction orthogonal to the first polarization direction. As shown in FIG. 1A, the converted color beams Lr, Lg and Ly (for example, the red beam, the green beam and the yellow beam) and the first portion beam $L_{P1\_S}$ and the second portion beam $L_{P2\_S}$ (i.e. the blue laser) that are processed with the polarization conversion are all reflected by the polarization and color separation unit 1130 to the same direction to reach the light valve 1200. The color beams are reflected by the light valve 1200 to form the image beam L1, and the image beam is transmitted to the projection lens 1300.

As described above, by configuring the wavelength conversion areas 1122R, 1122G and 1122Y and the polarization conversion area 1124 on the wavelength conversion device 1120, and using in collaboration with the polarization and color separation unit 1130, the converted color beams Lr, Lg and Ly and the excitation beam $L_{ex}$ including the first portion beam $L_{P1\_S}$ and the second portion beam $L_{P2\_S}$ are guided to the same direction to display a color image. In other words, the projection apparatus 1000 can achieve the above effect without using a plurality of optical devices or a plurality of reflectors, so that the projection apparatus 1000 of the embodiment may have a smaller size compared to a conventional projection apparatus.

Second Embodiment

Figure 2:
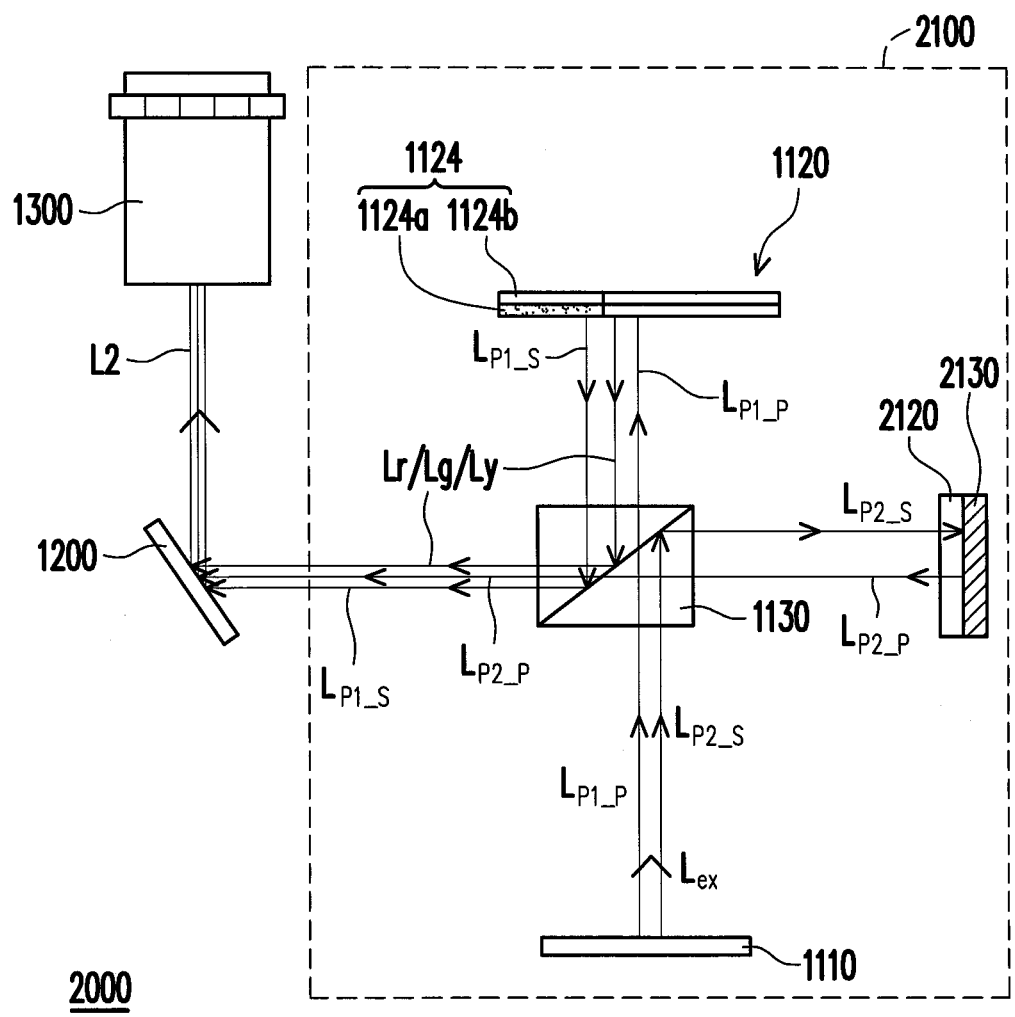
FIG. 2 is a top view of a projection apparatus according to a second embodiment of the invention.

FIG. 2 is a top view of a projection apparatus 2000 according to a second embodiment of the invention. The projection apparatus 2000 of FIG. 2 is similar to the projection apparatus 1000 of FIG. 1A, and a difference therebetween is that a light source module 2100 of FIG. 2 further includes a quarter-wave plate 2120, and the light source module 2100 of FIG. 2 does not have the polarization conversion system 1140 of FIG. 1A.

As shown in FIG. 2, the polarization and color separation unit 1130 is disposed between the light-emitting device 1110 and the quarter-wave plate 2120. The polarization and color separation unit 1130 reflects the second portion beam $L_{P2\_S}$ with the second polarization direction to the quarter-wave plate 2120, and the quarter-wave plate 2120 converts the second polarization direction (for example, the S-polarization) of the second portion beam $L_{P2\_S}$ to the first polarization direction (for example, the P-polarization).

Besides, the light source module 2100 further includes a reflection unit 2130. The reflection unit 2130 reflects the converted second portion beam $L_{P2\_P}$ with the first polarization direction to the polarization and color separation unit 1130. In the embodiment, the quarter-wave plate 2120 is disposed between the polarization and color separation unit 1130 and the reflection unit 2130. In detail, the quarter-wave plate 2120 is disposed on the reflection unit 2130. Moreover, the reflection unit 2130 of the embodiment can be a metal mirror, a reflection film or other suitable reflection optical devices with high reflectivity.

In detail, when the second portion beam $L_{P2\_S}$ with the second polarization direction is reflected to the quarter-wave plate 2120 by the polarization and color separation unit 1130, the second portion beam $L_{P2\_S}$ with the second polarization direction passes through the quarter-wave plate 2120 back and forth for twice, and is converted into the second portion beam $L_{P2\_P}$ with the first polarization direction by the quarter-wave plate 2120, and is again reflected to the polarization and color separation unit 1130 by the reflection unit 2130.

As shown in FIG. 2, since the polarization and color separation unit 1130 transmits the beam with the first polarization direction, the converted second portion beam $L_{P2\_P}$ with the first polarization direction may pass through the polarization and color separation unit 1130 for being transmitted to the light valve 1200. The second portion beam $L_{P2\_P}$ may, for example, serve as a blue light source of the projection apparatus 2000. On the other hand, when the first portion beam $L_{P1\_P}$ irradiates the polarization conversion area 1124 of the wavelength conversion device 1120, the first polarization direction of the first portion beam $L_{P1\_P}$ is converted into the second polarization direction to form the first portion beam $L_{P1\_S}$ with the second polarization direction, which is further reflected to the light valve 1200 by the polarization and color separation unit 1130.

Then, the first portion beam $L_{P1\_S}$ and the second portion beam $L_{P2\_P}$ used as the blue light and the color beam Lr (for example, the red beam) are processed by the light valve 1200 to form the image beam L2, and the image beam L2 is transmitted to the projection lens 1300. In this way, the projection apparatus 2000 can provide a color image frame. Detailed descriptions of the projection apparatus 2000 can refer to the first embodiment, which are not repeated herein.

Third Embodiment

Figure 3A:
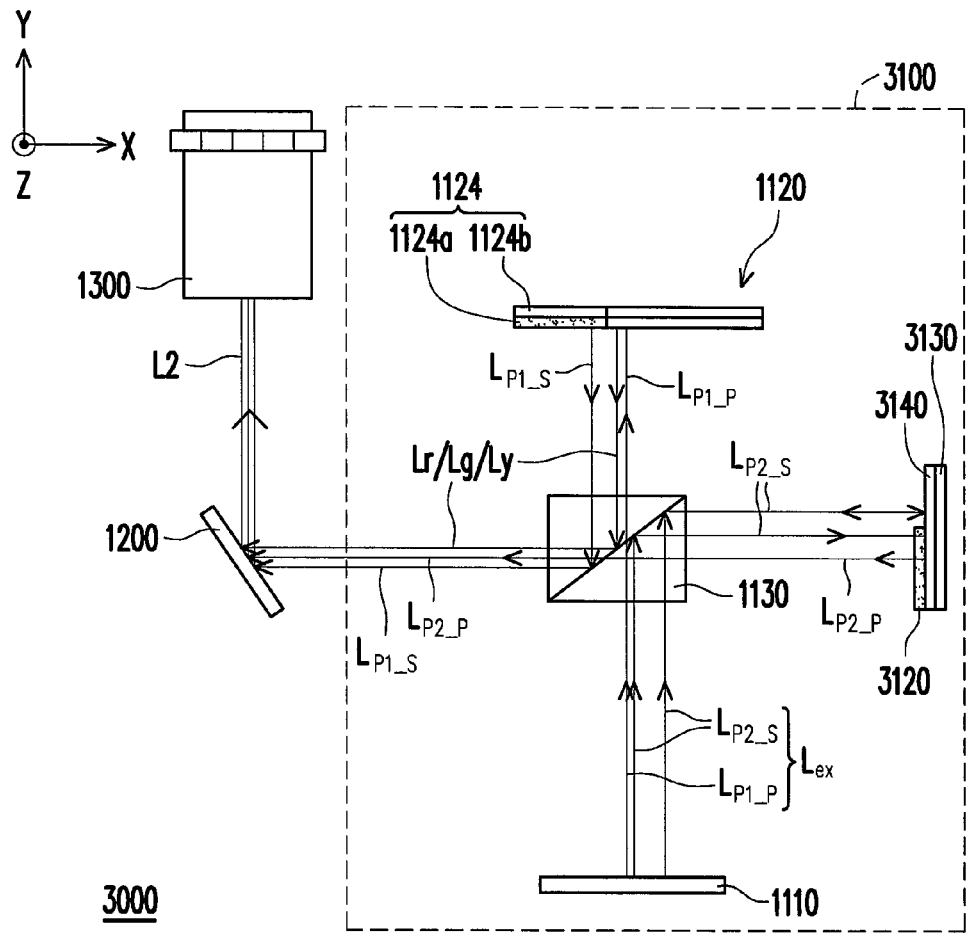
FIG. 3A is a top view of a projection apparatus according to a third embodiment of the invention.

FIG. 3A is a top view of a projection apparatus according to a third embodiment of the invention. The projection apparatus 3000 of FIG. 3A is similar to the projection apparatus 2000 of FIG. 2, and a difference therebetween is that the light source module of the projection apparatus 3000 further includes a quarter-wave plate 3120 and a polarization conversion device 3130.

Figure 3B:
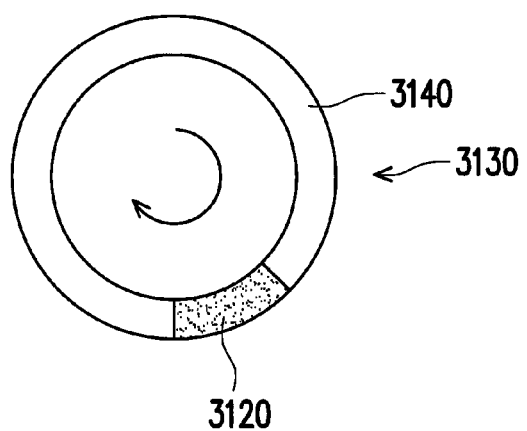
FIG. 3B is a top view of a quarter-wave plate and a polarization conversion device of FIG. 3A viewed along an X-direction.

FIG. 3B is a top view of the quarter-wave plate 3120 and the polarization conversion device 3130 of FIG. 3A viewed along an X-direction. Referring to FIG. 3A and FIG. 3B, the polarization conversion device 3130 of the embodiment is capable of rotating, which is, for example, a color wheel. The quarter-wave plate 3120 is disposed on the polarization conversion device 3130. In detail, the light source module 3100 further includes a reflection unit 3140, and the quarter-wave plate 3120 is disposed on the reflection unit 3140. In detail, when the second portion beam $L_{P2\_S}$ with the second polarization direction is reflected to the quarter-wave plate 3120 by the polarization and color separation unit 1130, the second portion beam $L_{P2\_S}$ with the second polarization direction passes through the quarter-wave plate 3120 back and forth for twice, and is converted into the second portion beam $L_{P2\_P}$ with the first polarization direction by the quarter-wave plate 3120, and is again reflected to the polarization and color separation unit 1130 by the reflection unit 3140.

As shown in FIG. 3A, since the polarization and color separation unit 1130 transmits the beam with the first polarization direction, the converted second portion beam $L_{P2\_P}$ with the first polarization direction can pass through the polarization and color separation unit 1130 for being transmitted to the light valve 1200. The second portion beam $L_{P2\_P}$ may, for example, serve as a blue light source of the projection apparatus 3000.

On the other hand, when the first portion beam $L_{P1\_P}$ that passes through the polarization and color separation unit 1130 irradiates the polarization conversion area 1124 of the wavelength conversion device 1120, the first polarization direction of the first portion beam $L_{P1\_P}$ is converted into the second polarization direction to form the first portion beam $L_{P1\_S}$ with the second polarization direction, which is further reflected to the light valve 1200 by the polarization and color separation unit 1130.

Then, the first portion beam $L_{P1\_S}$ and the second portion beam $L_{P1\_P}$ used as the blue light and the color beam Lr (for example, the red beam) are processed by the light valve 1200 to form an image beam L3, and the image beam L3 is transmitted to the projection lens 1300. In this way, the projection apparatus 3000 can provide a color image frame. Detailed descriptions of the projection apparatus 3000 can refer to the first embodiment, which are not repeated herein.

Besides, as shown in FIG. 3B, when the second portion beam $L_{P2\_S}$ with the second polarization direction does not irradiate the quarter-wave plate 3120 on the polarization conversion device 3130, but irradiates the reflection unit 3140 on the polarization conversion device 3130, the second portion beam $L_{P2\_S}$ with the second polarization direction is further reflected to the light-emitting device 1110 to facilitate recycling of the beam. In detail, a reflector (not shown) is, for example, disposed behind the light-emitting device 1110 to achieve a beam recycling effect.

In summary, the invention has at least one of following advantages. In the embodiments of the invention, by configuring the wavelength conversion area and the polarization conversion area in the wavelength conversion device, and in collaboration with usage of the polarization and color separation unit, the converted color beam and the excitation beam including the first portion beam and the second portion beam are guided to the same direction. In other words, the projection apparatus of the embodiments can use less optical devices to form a simple light transmission path, so as to reduce the number of the used optical devices, and reduce a size of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, "first wavelength conversion area", "second wavelength conversion area", etc. illustrated in the specification and the claims are merely used to name the elements and should not be regarded as limiting the upper or lower bound of the number of the components/devices.

What is claimed is:

1. A light source module, comprising:
   a light-emitting device, providing an excitation beam, wherein the excitation beam comprises a first portion beam, and the first portion beam has a first polarization direction;
   a wavelength conversion device, disposed on a transmission path of the first portion beam, wherein the wavelength conversion device is suitable for rotating and comprises:
   a first wavelength conversion area and a polarization conversion area, wherein when the wavelength conversion device rotates, the first portion beam of the excitation beam alternately irradiates the first wavelength conversion area and the polarization conversion area, when the first portion beam irradiates the first wavelength conversion area, the first portion beam is converted into a first color beam, and when the first portion beam irradiates the polarization conversion area, the first polarization direction of the first portion beam is converted to a second polarization direction; and
   a polarization and color separation unit, disposed between the wavelength conversion device and the light-emitting device, wherein the polarization and color separation unit transmits the first portion beam with the first polarization direction, and reflects the first portion beam with the second polarization direction and the first color beam to a same direction.

2. The light source module as claimed in claim 1, wherein the polarization and color separation unit comprises:
   a polarization unit, transmitting the first portion beam with the first polarization direction, and reflecting the first portion beam with the second polarization direction; and
   a color separation unit, disposed between the polarization unit and the wavelength conversion device and adhered to the polarization unit, transmitting the excitation beam, and reflecting the first color beam.

3. The light source module as claimed in claim 1, wherein the excitation beam further comprises a second portion beam having the second polarization direction, and the light source module further comprises a polarization conversion system disposed between the polarization and color separation unit and the light-emitting device, wherein the polarization conversion system transmits the first portion beam with the first polarization direction, and converts the second polarization direction of the second portion beam to the first polarization direction, so as to transmit the second portion beam.

4. The light source module as claimed in claim 3, wherein the polarization conversion system further comprises:
   a first polarization beam splitter unit, disposed on a transmission path of the excitation beam, transmitting the first portion beam with the first polarization direction, and reflecting the second portion beam with the second polarization direction;
   a half-wave plate, disposed on a transmission path of the second portion beam with the second polarization direction, and converting the second polarization direction of the second portion beam to the first polarization direction; and
   a second polarization beam splitter unit, disposed between the first polarization beam splitter unit and the half-wave plate, and reflecting the second portion beam with the second polarization direction to the half-wave plate.

5. The light source module as claimed in claim 4, wherein the polarization and color separation unit and the wavelength conversion device are disposed on a transmission path of the second portion beam with the first polarization direction, and the polarization and color separation unit transmits the second portion beam with the first polarization direction,
   wherein when the second portion beam with the first polarization direction irradiates the polarization conversion area of the wavelength conversion device, the first polarization direction of the second portion beam is converted to the second polarization direction, and the second portion beam is reflected to a direction the same as a transmission direction of the first color beam by the polarization and color separation unit.

6. The light source module as claimed in claim 1, wherein the excitation beam further comprises a second portion beam having the second polarization direction, and the light source module further comprises a quarter-wave plate,
   wherein the polarization and color separation unit is disposed between the light-emitting device and the quarter-wave plate, and reflects the second portion beam with the second polarization direction to the quarter-wave plate, and the quarter-wave plate converts the second polarization direction of the second portion beam to the first polarization direction.

7. The light source module as claimed in claim 6, further comprising a first reflection unit to reflect the second portion beam with the first polarization direction to the polarizaand color separation unit, wherein the quarter-wave plate is disposed between the polarization and color separation unit and the first reflection unit.

8. The light source module as claimed in claim 6, wherein the polarization and color separation unit is disposed on a transmission path of the second portion beam with the first polarization direction, and transmits the second portion beam with the first polarization direction.

9. The light source module as claimed in claim 6, further comprising a polarization conversion device, suitable for rotating, wherein the quarter-wave plate is disposed on the polarization conversion device.

10. The light source module as claimed in claim 9, further comprising a second reflection unit disposed on the polarization conversion device, and located between the quarter-wave plate and the polarization conversion device.

11. The light source module as claimed in claim 1, wherein the wavelength conversion device further comprises a second wavelength conversion area, wherein when the first portion beam irradiates the second wavelength conversion area, the first portion beam is converted to a second color beam.

12. A projection apparatus, comprising:
 a light source module, comprising:
  a light-emitting device, providing an excitation beam, wherein the excitation beam comprises a first portion beam, and the first portion beam has a first polarization direction;
  a wavelength conversion device, disposed on a transmission path of the first portion beam, wherein the wavelength conversion device is suitable for rotating and comprises a first wavelength conversion area and a polarization conversion area,
  wherein when the wavelength conversion device rotates, the first portion beam of the excitation beam alternately irradiates the first wavelength conversion area and the polarization conversion area, when the first portion beam irradiates the first wavelength conversion area, the first portion beam is converted into a first color beam, and when the first portion beam irradiates the polarization conversion area, the first polarization direction of the first portion beam is converted to a second polarization direction; and
  a polarization and color separation unit, disposed between the wavelength conversion device and the light-emitting device, wherein the polarization and color separation unit transmits the first portion beam with the first polarization direction, and reflects the first portion beam with the second polarization direction and the first color beam to a same direction;
 a projection lens, disposed on transmission paths of the first portion beam and the first color beam; and
 a light valve, disposed between the light source module and the projection lens.

13. The projection apparatus as claimed in claim 12, wherein the polarization and color separation unit comprises:
 a polarization unit, transmitting the first portion beam with the first polarization direction, and reflecting the first portion beam with the second polarization direction; and
 a color separation unit, disposed between the polarization unit and the wavelength conversion device, transmitting the excitation beam, and reflecting the first color beam.

14. The projection apparatus as claimed in claim 12, wherein the excitation beam further comprises a second portion beam having the second polarization direction, and the light source module further comprises a polarization conversion system disposed between the polarization and color separation unit and the light-emitting device, wherein the polarization conversion system transmits the first portion beam with the first polarization direction, and converts the second polarization direction of the second portion beam to the first polarization direction, so as to transmit the second portion beam.

15. The projection apparatus as claimed in claim 14, wherein the polarization conversion system further comprises:
 a first polarization beam splitter unit, disposed on a transmission path of the excitation beam, transmitting the first portion beam with the first polarization direction, and reflecting the second portion beam with the second polarization direction;
 a half-wave plate, disposed on a transmission path of the second portion beam with the second polarization direction, and converting the second polarization direction of the second portion beam to the first polarization direction; and
 a second polarization beam splitter unit, disposed between the first polarization beam splitter unit and the half-wave plate, and reflecting the second portion beam with the second polarization direction to the half-wave plate.

16. The projection apparatus as claimed in claim 15, wherein the polarization and color separation unit and the wavelength conversion device are disposed on a transmission path of the second portion beam with the first polarization direction, and the polarization and color separation unit transmits the second portion beam with the first polarization direction,
 wherein when the second portion beam with the first polarization direction irradiates the polarization conversion area of the wavelength conversion device, the first polarization direction of the second portion beam is converted to the second polarization direction, and the second portion beam is reflected to a direction the same as a transmission direction of the first color beam by the polarization and color separation unit.

17. The projection apparatus as claimed in claim 12, wherein the excitation beam further comprises a second portion beam having the second polarization direction, and the light source module further comprises a quarter-wave plate,
 wherein the polarization and color separation unit is disposed between the light-emitting device and the quarter-wave plate, and reflects the second portion beam with the second polarization direction to the quarter-wave plate, and the quarter-wave plate converts the second polarization direction of the second portion beam to the first polarization direction.

18. The projection apparatus as claimed in claim 17, further comprising a first reflection unit to reflect the second portion beam with the first polarization direction to the polarization and color separation unit, wherein the quarter-wave plate is disposed between the polarization and color separation unit and the first reflection unit.

19. The projection apparatus as claimed in claim 17, wherein the polarization and color separation unit is disposed on a transmission path of the second portion beam with the first polarization direction, and transmits the second portion beam with the first polarization direction.

20. The projection apparatus as claimed in claim 18, further comprising a polarization conversion device, suitable for rotating, wherein the quarter-wave plate is disposed on the polarization conversion device.

21. The projection apparatus as claimed in claim 20, further comprising a second reflection unit disposed on the polarization conversion device, and located between the quarter-wave plate and the polarization conversion device.

22. The projection apparatus as claimed in claim 12, wherein the wavelength conversion device further comprises a second wavelength conversion area, wherein when the first portion beam irradiates the second wavelength conversion area, the first portion beam is converted to a second color beam.

\* \* \* \* \*